United States Patent
Umeki et al.

(10) Patent No.: US 12,179,389 B2
(45) Date of Patent: Dec. 31, 2024

(54) PELLET PRODUCTION METHOD

(71) Applicant: TOYOBO CO., LTD., Osaka (JP)

(72) Inventors: Ryo Umeki, Shiga (JP); Yoshitaka Ayuzawa, Shiga (JP)

(73) Assignee: TOYOBO MC CORPORATION, Osaka (JP)

( * ) Notice: Subject to any disclaimer, the term of this patent is extended or adjusted under 35 U.S.C. 154(b) by 277 days.

(21) Appl. No.: 17/622,031

(22) PCT Filed: Jun. 2, 2020

(86) PCT No.: PCT/JP2020/021680
§ 371 (c)(1),
(2) Date: Dec. 22, 2021

(87) PCT Pub. No.: WO2020/261889
PCT Pub. Date: Dec. 30, 2020

(65) Prior Publication Data
US 2022/0250282 A1 Aug. 11, 2022

(30) Foreign Application Priority Data
Jun. 27, 2019 (JP) .................. 2019-119526

(51) Int. Cl.
*B29B 9/06* (2006.01)
*B29B 9/14* (2006.01)
(Continued)

(52) U.S. Cl.
CPC ............ *B29B 9/065* (2013.01); *B29B 9/14* (2013.01); *B29K 2077/00* (2013.01); *B29K 2309/02* (2013.01); *B29K 2309/08* (2013.01)

(58) Field of Classification Search
None
See application file for complete search history.

(56) References Cited

U.S. PATENT DOCUMENTS 5,607,700 A * 3/1997 Kando .................. B29B 9/06
264/37.32

FOREIGN PATENT DOCUMENTS

| JP | 6-238655 | 8/1994 |
| JP | 11-309715 | 11/1999 |

(Continued)

OTHER PUBLICATIONS

Machine English translation of JP2004137450A, accessed Nov. 27, 2023 (Year: 2004).*

(Continued)

*Primary Examiner* — Jacob T Minskey
*Assistant Examiner* — Adrianna N Konves
(74) *Attorney, Agent, or Firm* — WENDEROTH, LIND & PONACK, L.L.P.

(57) ABSTRACT

A pellet production method comprising: an operation in which a strand comprising a composition containing thermoplastic resin and reinforcing material is extruded from an orifice at a die; an operation in which the strand is drawn into water within a tank and is cooled; and an operation in which the cooled strand is cut to obtain a pellet; wherein at least one first guide roller for guiding the strand within the tank is provided within the tank, and an angle made by portions of the strand that are ahead of and behind that first guide roller which is in an upstreammost location is not less than 90° but is less than 180°; and wherein a ratio of a diameter of the pellet to a diameter of the orifice (diameter of the pellet/diameter of the orifice) is 0.45 to 0.80.

15 Claims, 1 Drawing Sheet

(51) Int. Cl.
  *B29K 77/00*   (2006.01)
  *B29K 309/02*  (2006.01)
  *B29K 309/08*  (2006.01)

(56) References Cited

FOREIGN PATENT DOCUMENTS

| | | |
|---|---|---|
| JP | 2000-117731 | 4/2000 |
| JP | 2004-137450 | 5/2004 |
| JP | 2008-265296 | 11/2008 |
| WO | 2012/046308 | 4/2012 |

OTHER PUBLICATIONS

Machine English translation of WO2012046308, accessed Nov. 27, 2023 (Year: 2014).*
Decision of Opposition to the grant of a patent issued on May 19, 2021 in the corresponding Japanese Patent Application No. 2019-119526, with English language translation.
Office Action issued Apr. 29, 2023 in corresponding Chinese Patent Application No. 202080030836.X, with English translation.
International Search Report issued Aug. 11, 2020 in International (PCT) Application No. PCT/JP2020/021680.
Notice of Reasons for Refusal issued Oct. 31, 2019 in Japanese Application No. 2019-119526, with English Translation.
Decision of Refusal issued Mar. 10, 2020 in Japanese Application No. 2019-119526, with English Translation.
International Preliminary Report on Patentability and Written Opinion of the International Searching Authority issued Dec. 28, 2021 in International (PCT) Application No. PCT/JP2020/021680.

\* cited by examiner

PELLET PRODUCTION METHOD

TECHNICAL FIELD

The present invention relates to a pellet production method comprising a composition containing thermoplastic resin and reinforcing material.

BACKGROUND ART

Compositions containing thermoplastic resin are used as household appliances, various types of automotive parts, and other such injection molded materials, fibers and yarns, woven and knit fabrics and other such clothing, tire cords, fishing nets, fishing line, and other such industrial and/or leisure filament materials, foodstuff packaging films, various types of container sheeting and/or bottle materials, and so forth. To improve the mechanical properties of such compositions, reinforcing material such as glass fiber is sometimes added thereto (see, for example, Patent Reference No. 1).

Pellets comprising a composition containing thermoplastic resin and reinforcing material might, for example, be manufactured by a method in which an extruder is used to cause strands comprising a composition which is in a molten state to be extruded from a die, water-cooling being carried out by causing the strands to be drawn into a tank filled with water, following which the water-cooled strands are cooled in air, and the air-cooled strands are cut.

PRIOR ART REFERENCES

Patent References

Patent Reference No. 1: Japanese Patent Application Publication Kokai No. H06[1994]-238655

SUMMARY OF INVENTION

Problem to be Solved by Invention

With such a production method, it is sometimes the case that the strands break between the die orifices and the water surface (the water surface formed by the water with which the tank is filled); more specifically, at a location in the vicinity of the die orifices. Such breaking of strands tends to occur when the composition contains reinforcing material. When breaking of strands occurs, time and effort are required to join the broken strands together, and some of the composition is lost.

To suppress occurrence of strand breakage, Patent Reference No. 1 discloses causing resin temperature to be held within a particular range immediately after filler is fed into an extruder. However, there is a tendency for the method disclosed in Patent Reference No. 1 to cause worsening of the mechanical properties of the resin composition obtained by that method. This is due to the fact that the barrel temperature is set to a high temperature, and also due to the fact that the increase in screw rotational speed causes increase in shear forces. Accordingly, provision of a technique such as would suppress strand breakage by a method other than that of Patent Reference No. 1 would be a significant accomplishment.

A problem addressed by the present invention, in the context of manufacture of pellets comprising a composition containing thermoplastic resin and reinforcing material, is to reduce the frequency of occurrence of strand breakage (to be clear, it is not an object of the present invention to suppress worsening of mechanical properties; more specifically, it is not an object of the present invention to suppress worsening of mechanical properties of molded products obtained by molding of pellets).

Means for Solving Problem

To solve these problems, the present invention is equipped with the constitution at item 1, below.

Item 1

A pellet production method comprising:
- an operation in which a strand comprising a composition containing thermoplastic resin and reinforcing material is extruded from an orifice at a die;
- an operation in which the strand is drawn into water within a tank and is cooled; and
- an operation in which the cooled strand is cut to obtain a pellet;
- wherein at least one first guide roller for guiding the strand within the tank is provided within the tank, and an angle made by portions of the strand that are ahead of and behind that first guide roller which is in an upstreammost location is not less than 90° but is less than 180°; and
- wherein a ratio of a diameter of the pellet to a diameter of the orifice (diameter of the pellet/diameter of the orifice) is 0.45 to 0.80.

Here, of the angles made by the portions of the strand that are ahead of and behind the first guide roller which is in the upstreammost location, note that this angle is the magnitude of the angle which opens toward the water surface as viewed from the side of the strand.

In accordance with item 1, because first guide roller(s) for guiding the strand are provided within the tank, the curvature of the strand is produced at the first guide roller(s).

Here, if that curvature were to be too sudden, there are situations in which excessive curvature might remain at the strand. The reason for this is that the flexibility of the strand decreases as solidification of the strand progresses as a result of its being cooled in water.

Curvature remaining in the strand will cause increase in runout, i.e., chaotic motion, at the strand, and runout of the strand will cause occurrence of strand breakage. The reason for this is that runout at the strand causes stresses (shear stresses) such as would tend to cause mutual displacement of the portion at the strand that has not yet exited the orifice and the portion of the strand that has already exited the orifice to act on the strand.

In accordance with item 1, by causing the angle made by the portions of the strand that are ahead of and behind the first guide roller which is in the upstreammost location to be not less than 90°, it will be possible to ensure that the curvature of the strand is gentle. It will therefore be possible to prevent occurrence of a situation in which excessive curvature remains thereat, and to suppress occurrence of runout at the strand. It will therefore be possible to suppress occurrence of strand breakage.

What is more, because it will be possible by causing the ratio (pellet diameter/orifice diameter) to be not less than 0.45 to prevent excessive tension from acting on the molten portion of the strand, this will make it possible to suppress occurrence of strand breakage.

In addition, by causing the ratio (pellet diameter/orifice diameter) to be not greater than 0.80, it will be possible to cause such tension as will suppress occurrence of runout at the molten portion of the strand to act on the molten portion of the strand. It will therefore be possible to suppress occurrence of strand breakage.

It is preferred that the invention be further equipped with the constitutions at item 2, below, and therebelow.

item 2

The pellet production method according to item 1 wherein the angle made by the portions of the strand that are ahead of and behind that first guide roller which is in the upstreammost location is not greater than 179°.

Because it will be possible by causing this angle to be not greater than 179° to cause the strand and the upstreammost first guide roller to come into reliable mutual contact, it will be possible to reduce the tendency for runout and chaotic motion of the strand occurring at locations downstream from the upstreammost first guide roller to propagate to locations upstream from the upstreammost first guide roller. It will therefore be possible to even more effectively suppress occurrence of strand breakage. And because it will be possible to cause the strand and the upstreammost first guide roller to come into reliable mutual contact, it will also be possible to cause stresses occurring at the strand to be diffused as a result of coming in contact with the upstreammost first guide roller.

Item 3

The pellet production method according to item 1 or 2 wherein the operation in which the strand is cooled comprises an operation in which the strand that was water-cooled within the tank is air-cooled.

This will make it possible to cause at least a portion of the moisture adhering to the strand to be vaporized by the heat possessed by the strand.

Item 4

The pellet production method according to item 3 wherein
at least one second guide roller for causing the strand that was water-cooled within the tank to be guided through air is provided; and
an angle made by portions of the strand that are ahead of and behind that second guide roller which is in an upstreammost location is greater than the angle made by portions of the strand that are ahead of and behind the first guide roller which is in an upstreammost location.

Here, note that the former angle (i.e., the angle made by the portions of the strand that are ahead of and behind the upstreammost second guide roller) more specifically, of the angles made by the portions of the strand that are ahead of and behind the upstreammost second guide roller as viewed from the side of the strand—the magnitude of the angle which opens toward the ground is that angle.

Item 4 will make it possible to reduce occurrence of runout at the strand, and will make it possible to suppress occurrence of strand breakage. Description will be given with respect to this. When the strand experiences curvature at the upstreammost second guide roller, because solidification of the strand will have progressed further than was the case when it experienced curvature at the upstreammost first guide roller, it will have little flexibility. Because the strand has little flexibility, if the curvature at the upstreammost second guide roller is excessively tight, it may be the case that the strand will be unable to conform to that curvature. If the strand is unable to conform to that curvature, the strand will exhibit runout. To address this, in accordance with item 4, because the angle made by the portions of the strand that are ahead of and behind that second guide roller which is in the upstreammost location is greater than the angle made by the portions of the strand that are ahead of and behind that first guide roller which is in the upstreammost location, as compared with the opposite situation, the strand will be more easily able to conform to the curvature at the upstreammost second guide roller. Accordingly, it will be possible to reduce occurrence of runout at the strand, and it will be possible to suppress occurrence of strand breakage.

Item 5

The pellet production method according to any of items 1 through 4 wherein there is only one of the at least one first guide roller provided within the tank.

This will make it possible to limit the number of times that the strand experiences curvature underwater.

Item 6

The pellet production method according to any of items 1 through 5 wherein the thermoplastic resin comprises polyamide resin.

This will make it possible to obtain pellets comprising polyamide resin.

Item 7

The pellet production method according to any of items 1 through 6 wherein the reinforcing material is present within 100 mass % of the composition in an amount that is not less than 10 mass %.

This will make it possible to obtain pellets having mechanical properties which have been improved by reinforcing material(s).

Item 8

The pellet production method according to any of items 1 through 7 wherein a standard deviation of an aspect ratio of the pellet is not greater than 0.25.

Because the standard deviation is not greater than 0.25, it is fair to say that effective suppression of runout at the strand is made possible thereby.

item 9

The pellet production method according to any of items 1 through 8 wherein the strand is such that a length L thereof which is immersed in water within the tank satisfies the following formula.

$$L \leq K \times D_p \times v$$

At this formula, L is expressed in cm. K is 0.182. $D_p$ is pellet diameter, and is expressed in mm. v is the speed with which the strand is taken up (takeup speed), and is expressed in cm/second. The value of K (i.e., 0.182) is determined in such fashion as to cause the units of the value obtained by performing the calculation on the right side of the formula to be in cm.

By causing this formula to be satisfied (i.e., by causing L to be not greater than $K \times D_p \times v$), because it will be possible to prevent the strand from being excessively cooled during the water-cooling operation, it will be possible to prevent occurrence of a situation in which the flexibility of the strand is excessively low at the time that the strand is made to experience curvature at the initial second guide roller at the air-cooling operation (i.e., that second guide roller which is in the upstreammost location). Accordingly, because it will be possible to suppress occurrence of runout at the strand, it will be possible to suppress occurrence of strand breakage.

Item 10

The pellet production method according to any of items 1 through 9 wherein an extruder is used to extrude the strand.

Because an extruder is used, it will be possible to extrude specific quantities of strand.

item 11

The pellet production method according to any of items 1 through 10 wherein, at the operation in which the strand is extruded, the strand is extruded in air.

Because the strand is extruded in air, it will be possible to cause the strand to dissipate heat in the air.

Benefit of Invention

In the context of manufacture of pellets comprising a composition containing thermoplastic resin and reinforcing material, the present invention makes it possible to reduce the frequency of occurrence of strand breakage.

EMBODIMENTS FOR CARRYING OUT THE INVENTION

Below, description is given with respect to embodiments of the present invention.

1. Equipment Used for Pellet Production

Figure 1:
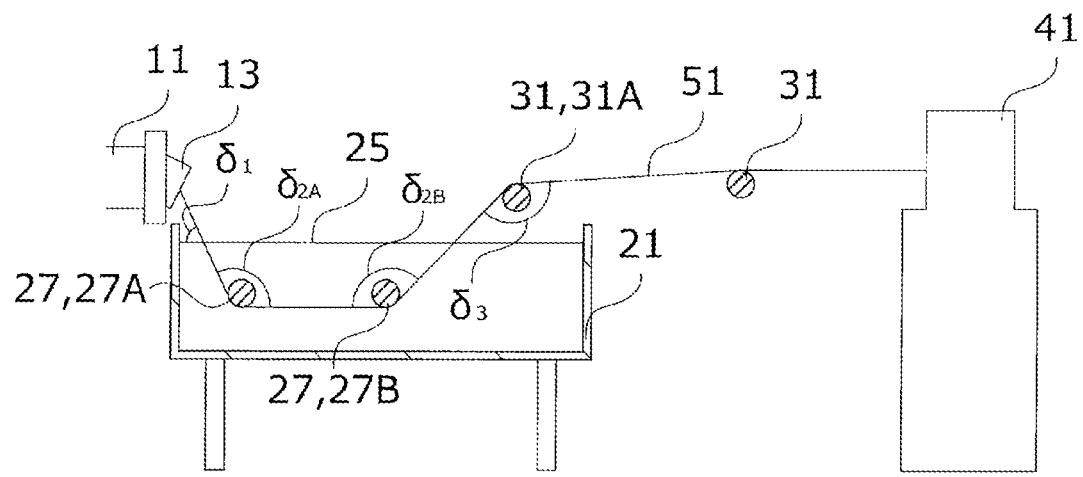
FIG. 1 Schematic diagram showing the constitution of equipment in accordance with the present embodiment.

As shown in FIG. 1, in accordance with the present embodiment, extruder 11, tank 21, pelletizer 41, and so forth are used to produce pellets comprising a composition. Description will be given with respect to this equipment.

Extruder 11 comprises a screw (not shown), and a cylinder (not shown) which surrounds the screw. In other words, extruder 11 comprises a cylinder, and a screw which is disposed within the cylinder. Extruder 11 is such that the rotating screw is capable of causing composition raw material to be kneaded as it is conveyed, and of causing a specific quantity of the composition to be extruded therefrom. As extruder 11, single-screw extruders and twin-screw extruders may be cited as examples. Of these, twin-screw extruders are preferred.

Die 13 is attached to extruder 11. Die 13 may be attached to the cylinder by way of an adapter. To permit flow of composition which is conveyed thereto from the outlet of extruder 11, die 13 has a flow path (hereinafter "nozzle"). The nozzle outlet, i.e., orifice, is circular in shape. Note, however, that the shape of the orifice is not limited to the foregoing. For example, it may be elliptical in shape. A plurality of orifices (not shown) are provided in such fashion as to be arrayed in the width direction of die 13. With regard to the number of orifices that are present, there might be 1 to 50 thereof, or there might be 5 to 30 thereof, for example.

Tank 21 is arranged so as to be capable of receiving strand(s) 51 which exit die 13. In other words, tank 21 is arranged at a location which is downstream from extruder 11. A strand-cooling bath may be favorably used as tank 21. Tank 21 contains water. The water surface 25 formed by that water is at a location which is lower than the orifices of die 13.

Provided within tank 21 is at least one guide roller 27 for guiding strand(s) 51. With regard to the number of guide rollers 27 that are present, there might be 1 to 10 thereof, or there might be 2 to 7 thereof, for example. Here, the upstreammost guide roller 27 will be referred to as guide roller 27A, and a guide roller 27 which is downstream from guide roller 27A will be referred to as guide roller 27B. Respective guide rollers 27 are arranged so as to come in contact with the upper portion of strand 51, and more specifically, with that portion thereof which is toward water surface 25 in the radial direction of strand 51. The shafts of the respective guide rollers 27 extend in a direction which is horizontal and which is in the transverse direction (hereinafter "TD"). Note that FIG. 1 shows a situation in which a plurality of, and more specifically two, guide rollers 27 are provided.

Downstream from tank 21 as well, at least one guide roller 31 for guiding strand(s) 51 is provided. With regard to the number of guide rollers 31 that are present, there might be 1 to 10 thereof, or there might be 2 to 7 thereof, for example. Here, the upstreammost guide roller 31 will be referred to as guide roller 31A. Respective guide rollers 31 are arranged so as to come in contact with the lower portion of strand 51, and more specifically, with that portion thereof which is toward the ground in the radial direction of strand 51. The shafts of the respective guide rollers 31 extend in a direction which is horizontal and which is in the TD. Note that FIG. 1 shows a situation in which a plurality of, and more specifically two, guide rollers 31 are provided.

Pelletizer 41 is arranged at a location downstream from guide roller(s) 31. Pelletizer 41 comprises a takeup roll (not shown) for takeup of strand 51, and a cutter (not shown) for cutting strand 51 after it has been taken up. Pelletizer 41 may cause pellets to be formed by causing the cutter to cut the strand 51 as the strand 51 is taken up by the roll.

At a pellet production method in accordance with the present embodiment, strand 51 is extruded in air from die 13 of extruder 11, enters the water within tank 21, is made to advance while underwater in parallel fashion with respect to guide roller(s) 27, emerges therefrom so as to be above the water, is made to advance while in the air in parallel fashion with respect to guide roller(s) 31, and is cut at pelletizer 41.

2. Pellet Production Method

A pellet production method in accordance with the present embodiment includes an operation (hereinafter "extruding operation") in which a strand 51 comprising a composition is extruded from a die 13, an operation (hereinafter "cooling operation") in which the strand 51 is cooled, and an operation (hereinafter "pelletizing operation") in which the cooled strand 51 is cut to obtain pellets. The operation in which the strand 51 is cooled (cooling operation) includes an operation (hereinafter "water-cooling operation") in which the strand 51 is pulled into and cooled in water within a tank 21, and an operation (hereinafter "air-cooling operation") in which the water-cooled strand 51 is cooled in air.

2.1. Operation in which Strand Comprising Composition Is Extruded (Extruding Operation)

At the extruding operation, composition raw materials, e.g., thermoplastic resin and reinforcing material and/or the like are kneaded, and strand(s) 51 comprising the composition are extruded in air from orifice(s) at die 13.

As composition raw materials, thermoplastic resin(s), reinforcing material(s), and so forth may be cited as examples. These will be described in further detail below. By kneading the raw materials, it is possible to fabricate the composition.

The raw materials for the composition are kneaded at extruder 11. Where a twin-screw extruder is used to carry out kneading, it is preferred that the ratio (hereinafter "screw L/D") of screw length L (mm) to screw diameter D (mm) be 10 to 100. When this is not greater than 100, it will be possible to suppress reduction in the mechanical strength of the composition that might otherwise occur as a result of thermal degradation.

It is preferred that the cylinder temperature of extruder 11 be set so as to be not less than 10° C. higher than the melting point of the thermoplastic resin, more preferred that this be set to so as to be not less than 20° C. higher than same, and still more preferred that this be set to so as to be not less than 30° C. higher than same. The reason is that this will make it possible to cause effective melting of the thermoplastic resin. It is preferred that the cylinder temperature be set so as to be not greater than 80° C. higher than the melting point of the thermoplastic resin. The reason is that an excessively high cylinder temperature would cause marked thermal degradation of the thermoplastic resin. Where the thermoplastic resin comprises a plurality of species, what is referred to herein as the "melting point of the thermoplastic resin" is the highest melting point thereamong.

It is preferred that the amount (hereinafter "extruded amount") of strand(s) 51 extruded from the orifice(s) of die 13 be not less than 5 kg/hr, more preferred that this be not less than 10 kg/hr, still more preferred that this be not less than 100 kg/hr, still more preferred that this be not less than 150 kg/hr, still more preferred that this be not less than 200 kg/hr, and still more preferred that this be not less than 230 kg/hr. When this is not less than 5 kg/hr, the pellet production volume per unit time will be superior. It is preferred that the extruded amount be not greater than 2000 kg/hr, more preferred that this be not greater than 1000 kg/hr, still more preferred that this be not greater than 800 kg/hr, and still more preferred that this be not greater than 700 kg/hr.

At least in the vicinity of the orifices, the nozzles of die 13 extend in such fashion as to be inclined with respect to the horizontal direction such that they are brought nearer to the water surface 25. That is, the direction in which material is expelled from the nozzle is inclined with respect to the horizontal direction so as to be brought nearer to the water surface 25. It is preferred that in the vicinity of the orifices the inclination of the nozzles, i.e., the inclination of the direction in which material is expelled therefrom, be not less than 5° with respect to the horizontal direction, and it is more preferred that this be not less than 10° with respect thereto. It is preferred that the inclination of the nozzle be not greater than 90° with respect to the horizontal direction, and it is more preferred that this be not greater than 85° with respect thereto. Note that the nozzle need not be inclined with respect to the horizontal direction from one end to the other in the machine direction (hereinafter "MD").

It is preferred that the diameter $D_n$ of the orifices at die 13 be not less than 2 mm, and more preferred that this be not less than 2.5 mm. When this is not less than 2 mm, because it will be possible to ensure that there will be adequate strength at the molten portion of strand 51, it will be possible to suppress occurrence of strand breakage due to insufficient strength. It is preferred that diameter $D_n$ be not greater than 10 mm, and more preferred that this be not greater than 7 mm. When this is not greater than 10 mm, because it will be possible to cause effective cooling of the interior of strand 51, it will be possible to effectively promote solidification of the interior thereof at the water-cooling operation. Accordingly, because it will be possible to prevent the cross-sectional shape of strand 51 from becoming excessively deformed due to pressure exerted on strand 51 by guide roller 27, it will be possible to suppress production of excessively flattened pellets. When the orifice is elliptical in shape, note that diameter $D_n$ indicates the maximum diameter of the orifice.

The extruding operation might, for example, employ a procedure in which a blender is used to mix thermoplastic resin(s), reinforcing material(s), and additive(s) (e.g., coupling agent(s), stabilizer(s), release agent(s), and/or the like), and this is fed into extruder 11 by way of a hopper provided at a first supply port at extruder 11; or might employ a procedure in which a blender is used to mix thermoplastic resin(s) and additive(s), this is fed into extruder 11 by way of a hopper provided at a first supply port at extruder 11, and a feeder is used to cause reinforcing material to be fed into extruder 11 from a second supply port (hereinafter "side port") which is provided at a location that is downstream from the first supply port. Of course, procedure(s) other than these may be employed. At the extruding operation, to remove volatile components and/or decomposed low molecular weight components, and/or to further increase the reactivity of reinforcing material(s) and/or the like with respect to thermoplastic resin(s) (e.g., polyamide resin), note that it is preferred that a vacuum pump be used to apply suction between the side port and the die head.

The strand 51 which is extruded from die 13 breaks easily. The reason for this is that the strand 51 which is extruded therefrom comprises a composition which is in a molten state; for example, it might be in a molten state and at a temperature as high as 240° C. to 400° C.

Strand 51 has higher strength with respect to stresses in the tension direction than it has with respect to shear stresses (more specifically, stresses such as would tend to cause mutual displacement of portions at either side of a cross-section taken along the radial direction of strand 51). The reason for this is that because the fact that strand 51 is taken up by the takeup roll causes elongation of strand 51, polymers within strand 51 are oriented in the direction of travel of strand 51; i.e., the length direction of strand 51. Note, moreover, that where the composition that makes up the strand contains raw material in the form of glass fiber, the glass fiber will also be oriented in the direction of travel of strand 51.

2.2. Operation in which Strand Is Cooled (Cooling Operation)

At the cooling operation, the strand 51 which is extruded from die 13 is cooled as it is taken up and directed toward pelletizer 41. The reason for this is that it would be difficult at pelletizer 41 to cut strand 51 were it still in the molten state in which it exists after being extruded from die 13. At the cooling operation, strand 51 is drawn into the water within tank 21 and is cooled in water, and the water-cooled strand 51 is cooled in air.

2.2.1. Operation in which Strand Is Drawn into Water within Tank and Is Cooled in Water (Water-Cooling Operation)

At the water-cooling operation, the strand 51 which is extruded from die 13 is drawn into water within tank 21. It is preferred that the water within tank 21 be not less than 20° C., more preferred that this be not less than 25° C., and still more preferred that this be not less than 30° C. It is preferred that the water within tank 21 be not greater than 80° C., more preferred that this be not greater than 60° C., and still more preferred that this be not greater than 50° C. As the water which tank 21 may be made to contain, tap water, well water, rainwater, pure water, and so forth may be used. Reagent(s) and/or the like may be added to the water within tank 21.

At the water-cooling operation, strand 51 enters the water within tank 21 in such fashion that the angle $\delta_1$ of incidence with respect to the water is not less than 45° but is less than 90°. By causing the angle $\delta_1$ of incidence with respect to the water to be not less than 45°, because under the force of its own weight there will be a greater tendency for stresses in the tension direction to be produced than for shear stresses (more specifically, stresses such as would tend to cause mutual displacement of portions at either side of a cross-section taken along the radial direction of strand 51) to be produced, it will be possible to reduce the shear stresses which would be more likely to lead to breakage. It will therefore be possible to suppress breakage of strands that might otherwise occur under the force of their own weight. Because this (causing the angle $\delta_1$ of incidence with respect to the water to be not less than 45°) will also permit reduction in shear stresses (more specifically, stresses such as would tend to cause mutual displacement of portions at either side of a cross-section taken along the radial direction of strand 51) produced as a result of entry into the water, this will also make it possible to suppress breakage of strands caused by such shear stresses. It is preferred that the angle $\delta_1$ of incidence with respect to the water be not less than 50°, and more preferred that this be not less than 55°. Note that the angle $\delta_1$ of incidence with respect to the water is the magnitude of the acute angle that strand 51 makes with water surface 25 as viewed from the side of strand 51. That is, the angle $\delta_1$ of incidence with respect to the water is the magnitude of the acute angle that strand 51 makes with water surface 25 when strand 51 is viewed along the direction of the shaft of guide roller 27. Because causing the angle $\delta_1$ of incidence with respect to the water to be less than 90° makes it possible to prevent strand 51 from coming into contact with die 13 in accompaniment to runout of strand 51, this will make it possible to suppress breakage of strands caused by such contact. It is preferred that the angle $\delta_1$ of incidence with respect to the water be not greater than 85°, more preferred that this be not greater than 80°, and still more preferred that this be not greater than 75°.

With regard to the strand 51 after it has entered the water, whereas this is made to experience curvature at guide roller 27A, if the curvature is too sudden, it may be the case that excessive curvature will remain at strand 51. The reason for this is that flexibility of strand 51 decreases as solidification of strand 51 progresses as a result of its being cooled in water. Curvature remaining in strand 51 will cause increase in runout, i.e., chaotic motion, at strand 51. Runout of strand 51 causes occurrence of strand breakage. The reason for this is that runout of strand 51 causes stresses (shear stresses) such as would tend to cause mutual displacement of the portion at strand 51 that has not yet exited the orifice and the portion of strand 51 that has already exited the orifice to act on strand 51.

To suppress occurrence of a situation in which excessive curvature remains at strand 51, it is preferred that the angle $\delta_{2A}$ made by the portions of strand 51 that are ahead of and behind guide roller 27A be not less than 90°, and more preferred that this be not less than 100°. When this is not less than 90°, because it will be possible to ensure that curvature of strand 51 is gentle, it will be possible to prevent occurrence of a situation in which excessive curvature remains thereat. It will therefore be possible to reduce occurrence of runout at strand 51. It is preferred that the angle $\delta_{2A}$ be less than 180°. To cause strand 51 and guide roller 27A to come into reliable mutual contact, it is more preferred that the angle $\delta_{2A}$ be not greater than 179°, and still more preferred that this be not greater than 178°. Because it is possible by causing this to be not greater than 179° to cause strand 51 and guide roller 27A to come into reliable mutual contact, it will be possible to reduce the tendency for runout and chaotic motion of strand 51 occurring at locations downstream from guide roller 27A to propagate to locations upstream from guide roller 27A. It will therefore be possible to even more effectively suppress occurrence of strand breakage. And because it is possible to cause strand 51 and guide roller 27A to come into reliable mutual contact, it will also be possible to cause stresses occurring at strand 51 to be diffused as a result of coming in contact with guide roller 27A. More specifically, of the angles made by the portions of strand 51 that are ahead of and behind guide roller 27A, angle $\delta_{2A}$ is the magnitude of the angle which opens toward water surface 25 as viewed from the side of strand 51.

It is preferred that the angle $\delta_{2B}$ made by the portions of strand 51 that are ahead of and behind guide roller 27B be not less than 90°, and more preferred that this be not less than 100°. It is preferred that angle $\delta_{2B}$ be less than 180°, more preferred that this be not greater than 179°, and still more preferred that this be not greater than 178°. By causing this to be not greater than 179°, it will be possible to cause strand 51 and guide roller 27B to come into reliable mutual contact. More specifically, of the angles made by the portions of strand 51 that are ahead of and behind guide roller 27B, angle $\delta_{2B}$ is the magnitude of the angle which opens toward water surface 25 as viewed from the side of strand 51.

It is preferred that the diameter of guide roller 27A be not less than 1 cm, and more preferred that this be not less than 2 cm. Because there is a tendency for the contact area between guide roller 27A and strand 51 to increase with increasing diameter of guide roller 27A, this will make it possible to reduce runout at the upstream portion of strand 51 (more specifically, the portion thereof from the orifice of die 13 to where it comes in contact with guide roller 27A). The diameter of guide roller 27A might be not greater than 20 cm, or it might be not greater than 15 cm, for example.

It is preferred that the diameters of guide rollers 27 be not less than 1 cm, and more preferred that these be not less than 2 cm. Because there is a tendency for the contact areas between the respective guide rollers 27 and strand 51 to increase with increasing diameters of respective guide rollers 27, this will make it possible to reduce runout at the upstream portion of strand 51 (e.g., the portion thereof from the orifice of die 13 to where it comes in contact with guide roller 27A). The diameters of respective guide rollers 27 might be not greater than 20 cm, or they might be not greater than 15 cm, for example. The diameters of respective guide rollers 27 might be mutually identical or they might be different.

It is preferred that the length (hereinafter "water immersion length") L of strand 51 that is immersed in water within tank 21 satisfy the following formula. Here, water immersion length L is the length of strand 51 itself between the point at which strand 51 enters the water to the point at which strand 51 emerges therefrom so as to be above the water.

$$L \leq K \times D_p \times v$$

At this formula, water immersion length L is expressed in cm. K is 0.182. $D_p$ is pellet diameter, and is expressed in mm (pellet diameter $D_p$ will be described in further detail below). v is the speed with which strand 51 is taken up (takeup speed), and is expressed in cm/second. The value of K (i.e., 0.182) is determined in such fashion as to cause the units of the value obtained by performing the calculation on the right side of the formula to be in cm.

By causing this formula to be satisfied (i.e., by causing water immersion length L to be not greater than $K \times D_p \times v$), because it will be possible to prevent strand 51 from being excessively cooled during the water-cooling operation, it will be possible to prevent occurrence of a situation in which the flexibility of strand 51 is excessively low at the time that strand 51 is made to experience curvature at guide roller 31A. Accordingly, it will be possible to reduce occurrence of runout at strand 51.

2.2.2. Operation in Which Water-Cooled Strand is Cooled in Air (Air-Cooling Operation)

At the air-cooling operation, the water-cooled strand 51 is cooled in air. At the air-cooling operation, at least a portion of the moisture adhering to strand 51 might be vaporized by heat possessed by strand 51. As a result, it is possible to suppress absorption of water following pelletizing. To volatilize the moisture adhering to strand 51, it is preferred that air be made to flow over strand 51. Where a blower is used, causing the wind pressure delivered by the blower to be not less than 0.1 MPa and causing the airflow produced thereby to be not less than 5 m³/min will make it possible to effectively volatilize the moisture adhering to strand 51.

With regard to the strand 51 after it has been cooled in water, whereas this is made to experience curvature at guide roller 31A, if the curvature is too sudden, this will tend to cause occurrence of runout at strand 51. The reason for this is that because solidification will have progressed due to its having been cooled in water, strand 51 will not be very flexible.

To suppress occurrence of runout at strand 51, it is preferred that the angle $\delta_3$ made by the portions of strand 51 that are ahead of and behind guide roller 31A be not less than 140°, more preferred that this be not less than 150°, still more preferred that this be not less than 160°. When this is not less than 140°, because it will be possible to ensure that curvature of strand 51 is gentle, it will be possible to suppress occurrence of runout at strand 51. It is preferred that angle $\delta_3$ be not greater than 179°, more preferred that this be not greater than 178°, and more preferred that this be not greater than 175°. More specifically, of the angles made by the portions of strand 51 that are ahead of and behind guide roller 31A, angle $\delta_3$ is the magnitude of the angle which opens toward the ground as viewed from the side of strand 51.

It is preferred that angle $\delta_3$ be greater than angle $\delta_{2A}$. This will make it possible to reduce occurrence of runout at strand 51. Description will be given with respect to this. When strand 51 experiences curvature at guide roller 31A, because solidification of strand 51 will have progressed further than was the case when it experienced curvature at guide roller 27A, it will have little flexibility. Because strand 51 has little flexibility, if the curvature at guide roller 31A is excessively tight, it may be the case that strand 51 will be unable to conform to that curvature. If strand 51 is unable to conform to that curvature, strand 51 will exhibit runout. Here, if angle $\delta_3$ is greater than angle $\delta_{2A}$, as compared with the opposite situation (i.e., the situation in which angle $\delta_3$ is less than angle $\delta_{2A}$), strand 51 will be more easily able to conform to the curvature at guide roller 31A. Accordingly, ability to reduce runout at strand 51 will be greater if angle $\delta_3$ is greater than angle $\delta_{2A}$ than would be the case in the opposite situation.

It is preferred that the diameter of guide roller 31A be not less than 1 cm, and more preferred that this be not less than 2 cm. The diameter of guide roller 31A might be not greater than 20 cm, or it might be not greater than 15 cm, for example.

It is preferred that the diameters of respective guide rollers 31 be not less than 1 cm, and more preferred that these be not less than 2 cm. The diameters of respective guide rollers 31 might be not greater than 20 cm, or they might be not greater than 15 cm, for example. The diameters of respective guide rollers 31 might be mutually identical or they might be different.

While the length of the interval within which strand 51 is subjected to air-cooling may be chosen as appropriate, it is preferred that this be chosen so as to cause the temperature of strand 51 to be lowered enough to allow it to be cut at pelletizer 41. This will permit reduction in the frequency of occurrence of defective cutting.

2.3. Operation in which Air-Cooled Strand Is Cut To Obtain Pellets (Pelletizing Operation)

At the pelletizing operation, the air-cooled strand 51 is cut at pelletizer 41 to obtain pellets.

The pellets are normally cylindrical; more specifically, in the shape(s) of right circular cylinder(s). The shape of the pellet cross-section (hereinafter "cross-sectional shape") is normally elliptical. The reason for this is that the fact that pressure from guide roller(s) 27 acts on strand 51 causes the cross-sectional shape of strand 51 to be elliptical. Note, however, that the cross-sectional shape of the pellet is not limited to the foregoing. For example, it may be circular in shape. Note that the pellet cross-section refers to the cut surface formed by pelletizer 41.

Pellet diameter $D_p$ is less than orifice diameter $D_n$. The reason for this is that because the fact that strand 51 is taken up by the takeup roll causes tension to act on strand 51, strand 51 experiences elongation at the molten portion thereof (i.e., strand 51 experiences elongation at least at the portion thereof from die 13 to water surface 25). Note that pellet diameter $D_p$ is determined by using calipers to measure the maximum diameter of the pellet cross-section (the cut surface formed by pelletizer 41) and the minimum diameter of the pellet cross-section, and dividing the sum of the maximum diameter and the minimum diameter by two. Pellet diameter $D_p$ is the average value of 100 pellets.

It is preferred that pellet diameter $D_p$ be not less than 0.5 mm, more preferred that this be not less than 1.0 mm, still more preferred that this be not less than 1.5 mm, and still more preferred that this be not less than 2.0 mm. It is preferred that pellet diameter $D_p$ be not greater than 4.5 mm, more preferred that this be not greater than 4.0 mm, and still more preferred that this be not greater than 3.5 mm.

It is preferred that the aspect ratio of the pellets be not greater than 2.0, and more preferred that this be not greater than 1.9. Whereas there is a tendency for pellet specific surface area to decrease with decreasing pellet aspect ratio, because causing pellet aspect ratio to be not greater than 2.0 will act to limit the magnitude of the pellet specific surface area, this will make it possible to reduce absorption of water by pellets (e.g., absorption of water by pellets prior to packaging of pellets). The pellet aspect ratio might be not less than 1.1, or it might be not less than 1.2, for example. Note that pellet aspect ratio is the value obtained by dividing the maximum diameter of the pellet cross-section by the minimum diameter of the pellet cross-section. Pellet aspect ratio is the average value of 100 pellets. The pellet aspect ratio may be adjusted in accordance with the water temperature at tank 21, the orifice diameter $D_n$ at die 13, and/or the like.

The lower the standard deviation of the aspect ratio the smaller will be the runout at strand 51. The reason for this is that whereas the pressure which acts on strand 51 as a result of its coming in contact with guide roller(s) 27 varies in accompaniment to runout of strand 51, the aspect ratio will be proportional to that pressure.

It is therefore the case that the lower the standard deviation of the aspect ratio the more preferred this will be. It is preferred that the standard deviation thereof be not greater than 0.25, more preferred that this be not greater than 0.20, still more preferred that this be not greater than 0.15, and still more preferred that this be not greater than 0.10.

It is preferred that pellet length, more specifically length in the axial direction of the pellet, be not less than 1 mm, more preferred that this be not less than 1.5 mm, still more preferred that this be not less than 2 mm, and still more preferred that this be not less than 2.5 mm. It is preferred that pellet length be not greater than 15 mm, more preferred that this be not greater than 10 mm, still more preferred that this be not greater than 6 mm, still more preferred that this be not greater than 5 mm, and still more preferred that this be not greater than 4 mm.

It is preferred that pellet water content, more specifically water content of the pellets immediately following pelletization thereof, be less than 0.1 mass %. 2.4. Other Operations Where necessary, the pellets may be allowed to stand while dry air is directed at the pellets. By allowing the pellets to stand, it will be possible to cause at least a portion of the moisture adhering to the pellets to be vaporized by the heat possessed by the pellets. The pellets may be sorted as necessary, and may be packaged as necessary.

2.5. Ratio ($D_p/D_n$) of Pellet Diameter $D_p$ to Orifice Diameter $D_n$

The greater the tension that acts on the molten portion of strand 51 the smaller will be the ratio ($D_p/D_n$) of the pellet diameter $D_p$ to the orifice diameter $D_n$. The ratio ($D_p/D_n$) may therefore be used as an indicator of the tension that acts on the molten portion of strand 51. Note that the ratio ($D_p/D_n$) may be adjusted in correspondence to the speed with which strand 51 is taken up (takeup speed) and/or the extruded amount of strand 51.

Because it will be possible by causing the ratio ($D_p/D_n$) to be not less than 0.45 to prevent excessive tension from acting on the molten portion of strand 51, this will make it possible to suppress occurrence of strand breakage. It is preferred that the ratio ($D_p/D_n$) be not less than 0.50.

By causing the ratio ($D_p/D_n$) to be not greater than 0.80, it will be possible to cause such tension as will suppress occurrence of runout at the molten portion of strand 51 to act on the molten portion of strand 51. It is preferred that the ratio ($D_p/D_n$) be not greater than 0.79.

2.6. Speed with which Strand is Taken Up (hereinafter "Takeup Speed")

It is preferred that that the takeup speed be not less than 20 cm/second, more preferred that this be not less than 30 cm/second, still more preferred that this be not less than 40 cm/second, and still more preferred that this be not less than 50 cm/second. When this is not less than 20 cm/second, the pellet production volume per unit time will be superior. It is preferred that that the takeup speed be not greater than 150 cm/second, more preferred that this be not greater than 140 cm/second, and still more preferred that this be not greater than 120 cm/second.

2.7. Physical Properties of Composition

It is preferred that the strain at flexural failure of the composition, and more specifically, the strain at flexural failure of a test piece for three-point flexural testing prepared from pellets, be less then 10%. The strain at flexural failure may be adjusted by adjusting the amount of reinforcing material and so forth. Strand breakage tends to occur especially with a composition such as this. The reason for this is because the upper limit of the range in values for the thermoplastic resin content in a composition such as this will be constrained in accompaniment to the presence therein of reinforcing material in an amount such as will permit it to have a strain at flexural failure of less than 10%. It is moreover due to the fact that because the flexibility of a composition such as this will be greatly reduced when it is underwater, there will be a tendency for curvature to remain at strand 51. It is preferred that strain at flexural failure be not greater than 8%, and more preferred that this be not greater than 6%. The strain at flexural failure of the composition might be not less than 1%.

The strain at flexural failure of the composition is determined in accordance with SIS K 7171:2016. More specifically, test pieces for three-point flexural testing are prepared from pellets, and three-point flexural testing is carried out to determine the strain at flexural failure.

2.8. Composition, and Raw Material(s) for Same

The composition contains thermoplastic resin(s) and reinforcing material(s).

As thermoplastic resin, while there is no particular limitation with respect thereto, polyamide (PA), polyphenylene sulfide (PPS), liquid crystal polymer (LCP), aramid resin, polyether ether ketone (PEEK), polyether ketone (PEK), polyether imide (PEI), thermoplastic polyimide, polyamide imide (PAI), polyetherketoneketone (PEKK), polyphenylene ether (PPE), polyethersulfone (PES), polysulfone (PSU), polyarylate (PAR), polyester (PEs), polycarbonate (PC), polyoxymethylene (POM), polypropylene (PP), polyethylene (PE), polymethylpentene (TPX), polystyrene (PS), polymethyl methacrylate, acrylonitrile-styrene copolymer (AS), acrylonitrile-butadiene-styrene copolymer (ABS), fluororesin, polyacrylate, and so forth may be cited as examples. Of these, polyamide and polyester are preferred, and polyamide is particularly preferred. Any one species of thermoplastic resin may be used alone or a plurality thereof may be used in combination.

As polyamide, while there is no particular limitation with respect thereto, polycaproamide (polyamide 6), polytetramethylene adipamide (polyamide 46), polyhexamethylene adipamide (polyamide 66), polyundecamethylene adipamide (polyamide 116), poly-meta-xylylene adipamide (polyamide MXD6), poly-para-xylylene adipamide (polyamide PXD6), polytetramethylene sebacamide (polyamide 410), polyhexamethylene sebacamide (polyamide 610), polydecamethylene adipamide (polyamide 106), polydecamethylene sebacamide (polyamide 1010), polyhexamethylene dodecamide (polyamide 612), polydecamethylene dodecamide (polyamide 1012), polyhexamethylene isophthalamide (polyamide 6I), polytetramethylene terephthalamide (polyamide 4T), polypentamethylene terephthalamide (polyamide 5T), poly-2-methylpentamethylene terephthalamide (polyamide M-5T), polyhexamethylene terephthalamide (polyamide 6T), polyhexamethylene hexahydroterephthalamide (polyamide 6I (H)), polynonamethylene terephthalamide (polyamide 9T), polydecamethylene terephthalamide (polyamide 10T), polyundecamethylene terephthalamide (polyamide 11T), polydodecamethylene terephthalamide (polyamide 12T), polylauryllactam (polyamide 12), poly-11-aminoundecanoic acid (polyamide) 11), copolymers containing these structural units, and so forth may be cited as examples. Of these, polycaproamide (polyamide 6) and polyhexamethylene adipamide (polyamide 66) are preferred. Any one species of polyamide may be used alone or a plurality thereof may be used in combination.

It is preferred that thermoplastic resin be present within 100 mass % of the composition in an amount that is not less than 5 mass %, more preferred that this be not less than 10 mass %, still more preferred that this be not less than 15 mass %, still more preferred that this be not less than 25 mass %, still more preferred that this be not less than 35 mass %, and still more preferred that this be not less than 40 mass %. it is preferred that thermoplastic resin be present within 100 mass % of the composition in an amount that is not greater than 85 mass %, more preferred that this be not greater than 80 mass %, still more preferred that this be not greater than 75 mass %, and still more preferred that this be not greater than 70 mass %.

Reinforcing material(s) are substances capable of improving mechanical properties; more specifically, mechanical properties of molded products obtained by molding of pellets. There is no particular limitation with respect to shape(s) of reinforcing material(s), it being possible, for example, for these to be fibrous and/or granular. As reinforcing material, while there is no particular limitation with respect thereto, glass fiber, needle-like wollastonite, mica, talc, unfired clay, whiskers (e.g., potassium titanate whiskers), carbon fibers, ceramic fibers, silica, alumina, kaolin, quartz, powdered glass (milled fiber), graphite, glass flakes, calcium carbonate, barium sulfate, carbon black, metal powder, and the like may be cited as examples. Of these, inorganic reinforcing materials such as glass fiber and talc are preferred, glass fiber and talc are more preferred, and glass fiber is still more preferred. Any one species of reinforcing material may be used alone or a plurality thereof may be used in combination.

As fibrous reinforcing material, inorganic fiber such as glass fiber, organic fiber, metal fiber, and so forth may be cited. As inorganic fiber, glass fibers, carbon fibers, ceramic fibers, potassium titanate whiskers, and so forth may be cited as examples. Of these, glass fibers are preferred.

As glass fiber, glass fibers of chopped strand-like shape may be cited as an example.

It is preferred that glass fiber diameter be 1 μm to 100 μm. "Glass fiber diameter" refers to the diameter thereof in a section which is perpendicular with respect to the length direction of the glass fiber. Where there is a maximum diameter and a minimum diameter in such section, "glass fiber diameter" means the maximum diameter. It is preferred that the fiber lengths of the glass fibers be 0.1 mm to 10 mm.

In the case of granular reinforcing materials such as talc, it is preferred that average particle diameter be 1 μm to 100 μm. Average particle diameter is measured using a "SALD-2300" laser-diffraction-type particle size distribution measuring device manufactured by Shimadzu Corporation.

Reinforcing materials may be subjected to silane treatment such as aminosilane treatment. In other words, reinforcing materials may be subjected to surface treatment employing coupling agent(s) (more specifically, silane coupling agent(s)).

It is preferred that reinforcing material be present within 100 mass % of the composition in an amount that is not less than 10 mass %, more preferred that this be not less than 20 mass %, still more preferred that this be not less than 25 mass %, and still more preferred that this be not less than 30 mass %. Because this is not less than 10 mass %, it will be possible to obtain pellets having mechanical properties which have been improved by reinforcing material(s). It is preferred that reinforcing material be present within 100 mass % of the composition in an amount that is not greater than 90 mass %, more preferred that this be not greater than 85 mass %, still more preferred that this be not greater than 80 mass %, still more preferred that this be not greater than 70 mass %, still more preferred that this be not greater than 60 mass %, still more preferred that this be not greater than 55 mass %, and still more preferred that this be not greater than 50 mass %.

It is preferred that thermoplastic resin and reinforcing material be present within 100 mass % of the composition in a combined amount that is not less than 94 mass %, preferred that this be not less than 96 mass %, and more preferred that this be not less than 98 mass %. The combined amount in which these are present might be 100 mass %, or might be less than 100 mass %, or might be not greater than 99 mass %.

While coupling agent may be made to adhere in advance to reinforcing material, to increase ability of reinforcing material to wet thermoplastic resin, it is preferred that, separate from any coupling agent which may be made to adhere in advance to reinforcing material, coupling agent be added thereto. It is preferred. that coupling agent be added thereto in an amount that is not less than 0.1 part by mass, and more preferred that this be not less than 0.2 part by mass, for every 100 parts by mass of reinforcing material. It is preferred that coupling agent be added thereto in an amount that is not greater than 3.0 parts by mass, and more preferred that this be not greater than 2.0 parts by mass, for every 100 parts by mass of reinforcing material.

As an example of such a coupling agent, i.e., a coupling agent for addition thereto, silane coupling agent may be cited. Any one species of coupling agent may be used alone or a plurality thereof may be used in combination.

The composition may further comprise filler for improvement of properties (e.g., electrical properties) other than mechanical properties.

It is preferred that the composition further comprise stabilizer. As stabilizer, hindered-phenol-type antioxidants, sulfur-type antioxidants, phosphorous-type antioxidants, and other such organic-type antioxidants, thermal stabilizers, hindered-amine-type, benzophenone-type, imidazole-type, and other such photostabilizers, ultraviolet light absorbers, metal deactivators, copper compounds, alkali metal halide compounds, and so forth may be cited as examples. Of these, copper compounds are preferred. Any one species of stabilizer may be used alone or a plurality thereof may be used in combination. Moreover, while stabilizer content may be adjusted as appropriate, it is preferred that it be present within 100 mass % of the composition in an amount that is not greater than 5 mass %, more preferred that this be not greater than 4 mass %, and still more preferred that this be not greater than 3 mass %. Where the composition comprises a plurality of species of stabilizer, what is referred to herein as the "amount of stabilizer present therein" is the combined content thereof.

As copper compounds capable of being used as stabilizer, cuprous chloride, cuprous bromide, cuprous iodide, cupric chloride, cupric bromide, cupric iodide, cupric phosphate, cupric pyrophosphate, copper sulfide, copper nitrate, copper acetate or other such copper salts of organic carboxylic acids, and so forth may be employed. Any one species of copper compound may be used alone or a plurality thereof may be used in combination.

It is preferred that copper compound(s) be present within 100 mass % of the composition in an amount that is not less than 0.01 mass %. When this is not less than 0.01 mass %, it will be possible for the physical properties of composition to be satisfactorily maintained. It is preferred that copper compound(s) be present within 100 mass % of the composition in an amount that is not greater than 0.5 mass %, and more preferred that this be not greater than 0.4 mass %. When this is not greater than 0.5 mass %, this will make it possible to prevent worsening of physical properties due to copper compound(s).

As alkali metal halide compounds capable of being used as stabilizer, lithium chloride, lithium bromide, lithium iodide, sodium fluoride, sodium chloride, sodium bromide, sodium iodide, potassium fluoride, potassium chloride, potassium bromide, potassium iodide, and so forth may be cited. Note only can any one species hereof be used alone but a plurality thereof may also be used in combination.

It is preferred that alkali metal halide compound(s) be present within 100 mass % of the composition in an amount that is not less than 0.01 mass %, and more preferred that this be not less than 0.02 mass %. It is preferred that alkali metal halide compound(s) be present within 100 mass % of the composition in an amount that is not greater than 0.5 mass %, and more preferred that this be not greater than 0.4 mass %.

The composition may further comprise release agent(s), flame retardant(s), flame retardant synergist(s), nucleating agent(s), lubricant(s), flame retardant(s), antistatic agent(s), pigment(s), dye(s), and/or the like. One or any desired combination may be chosen from thereamong and used. As release agent, long-chain fatty acids as well as esters and metal salts thereof, amide-type compounds, polyethylene waxes, silicones, polyethylene oxides, and so forth may be cited. As long-chain fatty acid, those having 12 or more carbons being particularly preferred, stearic acid, 12-hydroxystearic acid, behenic acid, montanic acid, and so forth may be cited as examples. All or any portion of the carboxylic acid(s) may form metal salt(s) and/or be esterified by monoglycol(s) and/or polyglycol(s). As amide-type compound, ethylene bis-terephthalamide, methylene bis-stearyl amide, and the like may be cited. Any one of these release agents may be used alone or a mixture thereof may be used. It is preferred that release agent(s) be present within 100 mass % of the composition in an amount that is not less than 0.01 mass %, and more preferred that this be not less than 0.05 mass %. It is preferred that release agent(s) be present within 100 mass % of the composition in an amount that is not greater than 5.0 mass %, more preferred that this be not greater than 3.0 mass %, and still more preferred that this be not greater than 1.0 mass %.

With the goal of modifying the impact resistance and/or other such properties of polyamide resin, the composition may comprise olefin-type compound(s). As olefin-type compound(s), those which have been modified as desired may be employed. For example, where modified polyolefin- and/or styrene-type copolymer(s) are employed, these might be α-olefin-type and/or styrene-type (co)polymer(s) at which copolymerization, graft polymerization, and/or the like is used to cause monomers possessing carboxylic acid group(s) and/or carboxylic acid anhydride group(s) to be included within unmodified polymer molecule chain(s).

3. Various Modifications May Be Made To the Foregoing Embodiment

Various modifications may be made to the pellet production method at the foregoing embodiment. For example, modifications which may be made to the foregoing embodiment might include any one or more variations chosen from among the following.

The foregoing embodiment was described in terms of a constitution in which, at least in the vicinity of the orifices, the nozzles of die 13 extend in such fashion as to be inclined with respect to the horizontal direction such that they are brought nearer to the water surface 25. However, the foregoing embodiment is not limited to this constitution. For example, it is also possible to adopt a constitution in which, at least in the vicinity of the orifices, the nozzles of die 13 extend in such fashion as to not be inclined with respect to the horizontal direction. Note that the nozzle need not extend such that it is not inclined with respect to the horizontal direction from one end to the other in the MD direction.

The foregoing embodiment was described in terms of a constitution in which angle $\delta_1$ of incidence with respect to the water is not less than 45° but is less than 90°. However, the foregoing embodiment is not limited to this constitution. For example, angle $\delta_1$ of incidence with respect to the water might be less than 45°, or might be not less than 90°.

The foregoing embodiment was described in terms of a constitution in which angle $\delta_{2B}$ is not less than 90° but is less than 180°. However, the foregoing embodiment is not limited to this constitution. For example, angle $\delta_{2B}$ might be less than 90°, or might be not less than 180°.

Figure 2:
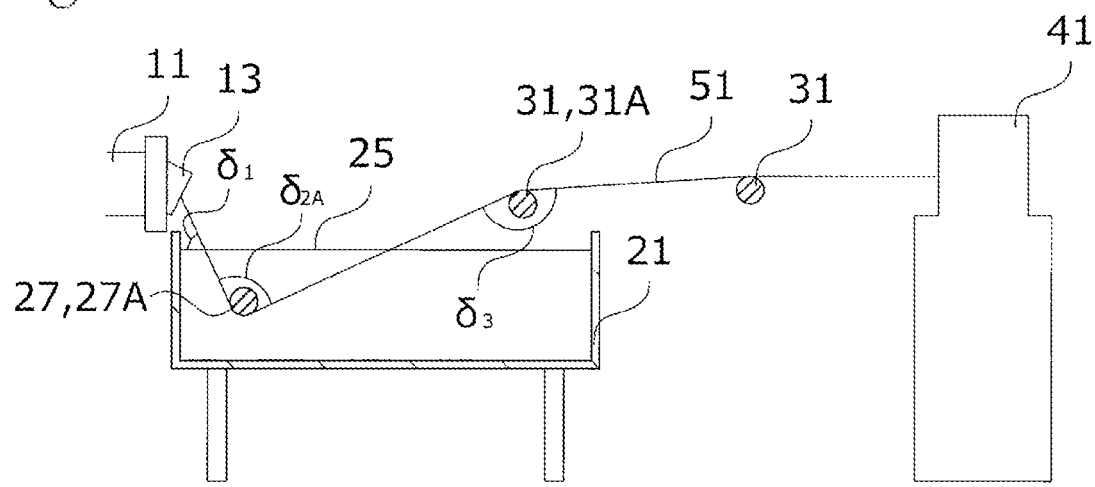
FIG. 2 Schematic diagram showing the constitution of equipment in accordance with a variation on the present embodiment.

The foregoing embodiment was described in terms of a constitution in which a plurality of guide rollers 27 are provided within tank 21. However, the foregoing embodiment is not limited to this constitution. For example, as shown in FIG. 2, it is also possible to adopt a constitution in which a single guide roller 27 (27A) is provided within tank 21. By causing a single guide roller 27 (27A) to be provided therewithin, it will be possible to limit the number of times that strand 51 experiences curvature while underwater. In a constitution in which a single guide roller 27 (27A) is provided within tank 21, it is still more preferred that angle $\delta_{2A}$ be not greater than 150°, still more preferred that this be not greater than 140°, and still more preferred that this be not greater than 130°. When this is not greater than 150°, because it will be possible to cause strand 51 and guide roller 27A to come into reliable mutual contact, it will be possible to reduce the tendency for runout and chaotic motion of strand 51 occurring at locations downstream from guide roller 27A to propagate to locations upstream from guide roller 27A. It will therefore be possible to even more effectively suppress occurrence of strand breakage. And because it will be possible to cause strand 51 and guide roller 27A to come into reliable mutual contact, it will also be possible to cause stresses occurring at strand 51 to be diffused as a result of coming in contact with guide roller 27A.

The foregoing embodiment was described in tennis of a constitution in which respective guide rollers 27 are arranged so as to come in contact with the upper portion of strand 51, and more specifically, with that portion thereof which is toward water surface 25 in the radial direction of strand 51. However, the foregoing embodiment is not limited to this constitution.

The foregoing embodiment was described in terms of a constitution in which a plurality of guide rollers 31 are provided downstream from tank 21. However, the foregoing embodiment is not limited to this constitution. For example, a constitution might be adopted in which, downstream from tank 21, only a single guide roller 31 is provided, or a constitution might be adopted in which no guide roller 31 is provided.

The foregoing embodiment was described in terms of a constitution in which respective guide rollers 31 are arranged so as to come in contact with the lower portion of strand 51, and more specifically, with that portion thereof which is toward the ground in the radial direction of strand 51. However, the foregoing embodiment is not limited to this constitution.

The foregoing embodiment was described in terms of a constitution in which angle $\delta_3$ is not less than 140°. However, the foregoing embodiment is not limited to this constitution.

The foregoing embodiment was described in terms of a constitution in which angle $\delta_3$ is greater than angle $\delta_{2A}$. However, the foregoing embodiment is not limited to this constitution.

The foregoing embodiment was described in terms of a constitution in which the air-cooled strand 51 is cut to obtain pellets. However, the foregoing embodiment is not limited to this constitution. For example, the air-cooled strand 51 might be subjected to further water-cooling.

Working Examples

Although working examples are used below to describe the present invention in more specific terms, it should be understood that the present invention, inasmuch as it does not go beyond the gist thereof, is not to be limited by the following working examples.

Strain at Flexural Failure

Strain at flexural failure of test pieces for three-point flexural testing prepared from pellets was determined in accordance with JIS K 7171:2016. More specifically, the test pieces for three-point flexural testing were placed on two support stages, and an indenter was used to apply a force at a central location between the supports to cause bending. Testing was carried out at the following conditions.

| Test pieces for three-point flexural testing | Length 100 mm, width 10 mm, thickness 4 mm |
| --- | --- |
| Distance between supports | 64 mm |
| Test speed | 2 mm/min |

Angle $\delta_1$ of Incidence With Respect to Water, Angle $\delta_{2,4}$, and Angle $\delta_3$ Polyester film ("E5000" manufactured by Toyobo Co., Ltd.; thickness 100 μm) 20 cm in width was suspended without sagging from the die orifices to the entrance of the pelletizer in parallel fashion with respect to the strand path. An angle protractor was used to measure the angle $\delta_1$ of incidence with respect to the water, the angle $\delta_{2,4}$, and the angle $\delta_3$ formed by the polyester film suspended in this fashion.

Pellet Diameter $D_p$

Pellet diameter $D_p$ was determined by using calipers to measure the maximum diameter of the pellet cross-section (the cut surface formed by the pelletizer) and the minimum diameter of the pellet cross-section, and dividing the sum of the maximum diameter and the minimum diameter by two. The pellet diameter $D_p$ shown in TABLE 1 is the average value of 100 pellets.

Aspect Ratio and Standard Deviation Thereof

Pellet aspect ratio is the value obtained by dividing the maximum diameter of the pellet cross-section by the minimum diameter of the pellet cross-section. The pellet aspect ratio shown in TABLE 1 is the average value of 100 pellets. The standard deviation of the aspect ratio is also shown in TABLE 1.

Water Content

Water content of pellets immediately following pelletization was measured at 200° C. using a Karl-Fischer-type moisture content measuring device (Model No. CA-100; manufactured by Mitsubishi Chemical Corporation).

Preparation of Pellets at Working Examples 1-8 and Comparative Examples 1-5

65 parts by mass of polyamide 6 ("Glamide T-840" manufactured by Toyobo Co., Ltd.), 34.3 parts by mass of talc (FU-51 manufactured by Fukuoka Talc Co., Ltd.), 0.3 part by mass of silane coupling agent ("KBE-903" manu-factured by Shin-Etsu Chemical Co., Ltd.), 0.2 part by mass of magnesium stearate ("NP-1500" manufactured by Tannan Kagaku Kogyo Co., Ltd.), and 0.2 part by mass of potassium iodide (Mitsui Chemicals, Inc.) were measured out and were mixed in a tumbler, these were thereafter fed into the main supply port of a twin-screw extruder ("TEM48BS" manufactured by Toshiba Machine Co., Ltd.) having a screw LID of 34 and a cylinder temperature of 270° C. and melt kneading was carried out, and strands were expelled therefrom by way of a die having 10 orifices at which the diameter $D_n$ was 4.3 mm. Note that the die used was a strand die having nozzles at which the nozzle expulsion direction was inclined 70° with respect to the horizontal direction so as to be brought nearer to the water surface.

The strands that exited the die were drawn into a tank containing water at a temperature of 30° C., the water-cooled strands were cooled in air, and the cooled strands were cut into pellets at a pelletizer to manufacture pellets. Note that the procedure up to this point was carried out using equipment constituted as shown in FIG. 2 under the conditions shown in TABLE 1. Note that the diameters of the respective guide rollers employed at the water-cooling operation and the air-cooling operation were 4.8 cm.

Pellets were dried for 12 hours at 100° C., following which an injection. molding machine ("IS80"; manufactured by Toshiba Machine Co., Ltd.) was used to carry out injection molding at a cylinder temperature of 275° C. and a mold temperature of 80° C. to prepare test pieces for three-point flexural testing).

Preparation of Pellets at Working Example 9

Except for the fact that 70 parts by mass of polyamide 66 ("Stabamid 27AE1K" manufactured by Solvay), 30 parts by mass of glass fiber ("T-275H" manufactured by Nippon Electric Glass Co., Ltd.), 0.02 part by mass of cupric bromide (manufactured by Fujifilm Wako Pure Chemical Corporation), and 0.2 part by mass of magnesium stearate ("NP-1500" manufactured by Tannan Kagaku Kogyo Co., Ltd.) were employed as pellet raw materials, cylinder temperature was set to 280° C., and operations were carried out in accordance with the conditions shown in TABLE 1, the same method as at Working Example 1 was employed to manufacture pellets. The pellets were used to prepare test pieces for three-point flexural testing in accordance with the same method as at Working Example 1.

Preparation of Pellets at Working Example 10

Except for the fact that 50 parts by mass of polyamide 66 ("Stabamid 27AE1K" manufactured by Solvay), 50 parts by mass of glass fiber ("T-275H" manufactured by Nippon Electric Glass Co., Ltd.), 0.02 part by mass of cupric bromide (manufactured by Fujifilm Wako Pure Chemical Corporation), and 0.2 part by mass of magnesium stearate ("NP-1500" manufactured by Tannan Kagaku Kogyo Co., Ltd.) were employed as pellet raw materials, cylinder temperature was set to 290° C., and operations were carried out in accordance with the conditions shown in TABLE 1, the same method as at Working Example 1 was employed to manufacture pellets. Except for the fact that cylinder temperature was set to 285° C., test pieces for three-point flexural testing were prepared from pellets in accordance with the same method as at Working Example 1.

TABLE 1

| | | $\delta_1$ (°) | $\delta_{2A}$ (°) | $\delta_3$ (°) | Orifice Diameter $D_a$ (mm) | Extruded Amount (kg/hr) | Water Immersion Length L (cm) | K × $D_p$ × v (cm) | Take-up Speed (cm/sec) | Strand Breakage Frequency (Number of Times that Breakage Occurred) | Water Content (mass %) | Pellet Diameter $D_p$ (mm) | Aspect Ratio | Standard Deviation of Aspect Ratio | Ratio of Diameter $D_p$ to Diameter $D_n$ ($D_p/D_n$) | Strain at Flexural Failure (%) |
|---|---|---|---|---|---|---|---|---|---|---|---|---|---|---|---|---|
| Working Example 1 | Blend A | 63 | 103 | 165 | 4.3 | 250 | 30 | 41 | 80 | 0 | 0.05 | 2.8 | 1.5 | 0.05 | 0.65 | 3.8 |
| Working Example 2 | Blend A | 65 | 101 | 165 | 4.3 | 300 | 30 | 40 | 65 | 0 | 0.04 | 3.4 | 1.8 | 0.09 | 0.79 | 3.8 |
| Working Example 3 | Blend A | 57 | 95 | 165 | 4.3 | 230 | 30 | 48 | 120 | 0 | 0.03 | 2.2 | 1.4 | 0.04 | 0.51 | 3.8 |
| Working Example 4 | Blend A | 40 | 118 | 165 | 4.3 | 260 | 30 | 48 | 105 | 0 | 0.04 | 2.5 | 1.2 | 0.04 | 0.58 | 3.8 |
| Working Example 5 | Blend A | 53 | 103 | 165 | 4.3 | 250 | 50 | 41 | 80 | 3 | 0.07 | 2.8 | 1.4 | 0.05 | 0.65 | 3.8 |
| Working Example 6 | Blend A | 68 | 93 | 165 | 4.3 | 610 | 50 | 84 | 140 | 5 | 0.05 | 3.3 | 1.8 | 0.23 | 0.77 | 3.8 |
| Working Example 7 | Blend A | 60 | 95 | 165 | 4.3 | 540 | 85 | 79 | 140 | 6 | 0.08 | 3.1 | 1.6 | 0.20 | 0.72 | 3.8 |
| Working Example 8 | Blend A | 30 | 129 | 165 | 4.3 | 250 | 30 | 41 | 80 | 0 | 0.05 | 2.8 | 1.3 | 0.04 | 0.65 | 3.8 |
| Working Example 9 | Blend B | 66 | 102 | 165 | 4.3 | 290 | 30 | 48 | 90 | 0 | 0.04 | 2.9 | 1.6 | 0.11 | 0.67 | 3.2 |
| Working Example 10 | Blend C | 70 | 95 | 165 | 4.3 | 320 | 30 | 44 | 80 | 0 | 0.03 | 3.0 | 1.7 | 0.09 | 0.70 | 2.0 |
| Comparative Example 1 | Blend A | 60 | 105 | 165 | 4.3 | 100 | 30 | 26 | 80 | 12 | 0.05 | 1.8 | 1.5 | 0.05 | 0.42 | 3.8 |
| Comparative Example 2 | Blend A | 30 | 125 | 165 | 4.3 | 310 | 30 | 39 | 60 | 10 | 0.06 | 3.6 | 1.7 | 0.15 | 0.84 | 3.8 |
| Comparative Example 3 | Blend A | 78 | 85 | 165 | 4.3 | 250 | 30 | 41 | 80 | 15 | 0.05 | 2.8 | 1.8 | 0.31 | 0.65 | 3.8 |
| Comparative Example 4 | Blend A | 75 | 70 | 165 | 4.3 | 250 | 30 | — | — | (Takeup impossible) | — | — | — | — | — | 3.8 |
| Comparative Example 5 | Blend A | 75 | 90 | 165 | 4.3 | 780 | 30 | 98 | 150 | 19 | 0.04 | 3.6 | 2.2 | 0.28 | 0.84 | 3.8 |

By causing the ratio ($D_p/D_n$) to be 0.45 to 0.80 and by causing angle $\delta_{2A}$ to be not less than 90° but less than 180°, it was possible to reduce the frequency of occurrence of strand breakage. At Comparative Example 4, note that it was not possible for strands to be taken up in continuous fashion due to the fact that strand breakage occurred frequently.

INDUSTRIAL UTILITY

Because a pellet production method in accordance with the present embodiment will make it possible to reduce the frequency of occurrence of strand breakage, it has industrial utility.

EXPLANATION OF REFERENCE NUMERALS

11 . . . extruder; 13 . . . die; 21 . . . tank; 25 . . . water surface; 27 . . . guide roller (in particular, the upstreammost guide roller 27 is guide roller 27A, and the guide roller 27 which is downstream from guide roller 27A is guide roller 27B); 31 . . . guide roller (in particular, the upstreammost guide roller 31 is guide roller 31A); 41 . . . pelletizer; 51 . . . strand; $\delta_1$ . . . angle of incidence with respect to water; $\delta_{2A}$ . . . angle (more specifically, the angle made by the portions of strand 51 that are ahead of and behind guide roller 27A); $\delta_{2B}$ . . . angle (more specifically, the angle made by the portions of strand 51 that are ahead of and behind guide roller 27B); $\delta_3$ . . . angle (more specifically, the angle made by the portions of strand 51 that are ahead of and behind guide roller 31A)

The invention claimed is:

1. A pellet production method comprising:
   an operation in which a strand comprising a composition containing thermoplastic resin and reinforcing material is extruded from an orifice at a die;
   an operation in which the strand is drawn into water within a tank and is cooled; and
   an operation in which the cooled strand is cut to obtain a pellet;
   wherein at least one first guide roller for guiding the strand within the tank is provided within the tank, and an angle made by portions of the strand that are ahead of and behind that first guide roller which is in an upstreammost location is not less than 90° but is less than 180°; and
   wherein a ratio of a diameter of the pellet to a diameter of the orifice (diameter of the pellet/diameter of the orifice) is 0.45 to 0.80.

2. The pellet production method according to claim 1 wherein the angle made by the portions of the strand that are ahead of and behind the first guide roller which is in the upstreammost location is not greater than 179°.

3. The pellet production method according to claim 1 wherein the operation in which the strand is cooled comprises an operation in which the strand that was water-cooled within the tank is air-cooled.

4. The pellet production method according to claim 3 wherein
at least one second guide roller for causing the strand that was water-cooled within the tank to be guided through air is provided; and
an angle made by portions of the strand that are ahead of and behind that second guide roller which is in an upstreammost location is greater than the angle made by portions of the strand that are ahead of and behind the first guide roller which is in an upstreammost location.

5. The pellet production method according to claim 1 wherein there is only one of the at least one first guide roller provided within the tank.

6. The pellet production method according to claim 1 wherein the thermoplastic resin comprises polyamide resin.

7. The pellet production method according to claim 1 wherein the reinforcing material is present within 100 mass % of the composition in an amount that is not less than 10 mass %.

8. The pellet production method according to claim 1 wherein a standard deviation of an aspect ratio of the pellet is not greater than 0.25.

9. The pellet production method according to claim 1 wherein the strand is such that a length L thereof which is immersed in water within the tank satisfies the following formula, $$L \leq K \times D_p \times v,$$

where, in this formula, L is expressed in cm;
K is 0.182;
$D_p$ is pellet diameter and is expressed in mm; and
v is speed with which the strand is taken up and is expressed in cm/second.

10. The pellet production method according to claim 1 wherein an extruder is used to extrude the strand.

11. The pellet production method according to claim 1 wherein, at the operation in which the strand is extruded, the strand is extruded in air.

12. The pellet production method according to claim 1 wherein the reinforcing material comprises glass fiber.

13. The pellet production method according to claim 1 wherein the reinforcing material comprises talc.

14. The pellet production method according to claim 1 wherein the angle made by the portions of the strand that are ahead of and behind the first guide roller which is in the upstreammost location is not less than 100°.

15. The pellet production method according to claim 1 wherein, at the operation in which the strand is cooled, an angle of incidence at which the strand enters the water within the tank is not less than 45° but is less than 90°.

* * * * *